(12) United States Patent
Thompto et al.

(10) Patent No.: US 12,705,056 B2
(45) **Date of Patent: *Aug. 11, 2026**

(54) COMPUTING SYSTEM HAVING AN ACCUMULATOR REGISTER HAVING ENTRIES HAVING A BIT WIDTH LARGER THAN A MAIN REGISTER FILE

(71) Applicant: International Business Machines Corporation, Armonk, NY (US)

(72) Inventors: Brian W. Thompto, Austin, TX (US); Maarten J. Boersma, Holzgerlingen (DE); Andreas Wagner, Wildberg (DE); Jose E. Moreira, Irvington, NY (US); Hung Q. Le, Austin, TX (US); Silvia Melitta Mueller, St. Ingbert (DE); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,608

(22) Filed: Jul. 28, 2023

(65) Prior Publication Data

US 2023/0367597 A1 Nov. 16, 2023

Related U.S. Application Data

(63) Continuation of application No. 17/458,717, filed on Aug. 27, 2021, now Pat. No. 11,755,325, which is a (Continued)

(51) Int. Cl.

| | |
|---|---|
| ***G06F 9/30*** | (2018.01) |
| ***G06F 9/38*** | (2018.01) |

(52) U.S. Cl.

CPC ...... *G06F 9/30098* (2013.01); *G06F 9/30036* (2013.01); *G06F 9/3012* (2013.01);

(Continued)

(58) Field of Classification Search

CPC ........................................................ G06F 9/384

See application file for complete search history.

(56) References Cited

U.S. PATENT DOCUMENTS

| | | |
|---|---|---|
| 5,838,984 A | 11/1998 | Nguyen et al. |
| 5,983,256 A | 11/1999 | Peleg et al. |

(Continued)

FOREIGN PATENT DOCUMENTS

| | | |
|---|---|---|
| CN | 101246435 A | 8/2008 |
| CN | 104969215 A | 10/2015 |

(Continued)

OTHER PUBLICATIONS

English-language translation of German Office Action dated Jan. 2, 2024, received in a corresponding foreign application, namely German File No. 11 2020 004 071.2, 12 pages.

(Continued)

*Primary Examiner* — Shawn Doman

(74) *Attorney, Agent, or Firm* — Scully, Scott, Murphy & Presser, P.C.

(57) ABSTRACT

A computer system, processor, and method for processing information is disclosed that includes at least one computer processor; a main register file associated with the at least one processor, the main register file having a plurality of entries for storing data, one or more write ports to write data to the main register file entries, and one or more read ports to read data from the main register file entries; one or more execution units including a dense math execution unit; and at least one accumulator register file having a plurality of entries for storing data. The results of the dense math execution unit in (Continued)

an aspect are written to the accumulator register file, preferably to the same accumulator register file entry multiple times, and the data from the accumulator register file is written to the main register file.

18 Claims, 7 Drawing Sheets

Related U.S. Application Data continuation of application No. 16/555,640, filed on Aug. 29, 2019, now Pat. No. 11,132,198.

(52) U.S. Cl.
CPC ........ *G06F 9/3001* (2013.01); *G06F 9/30109* (2013.01); *G06F 9/3013* (2013.01); *G06F 9/384* (2013.01)

(56) References Cited

U.S. PATENT DOCUMENTS

| | | | | |
|---|---|---|---|---|
| 6,029,006 | A | 2/2000 | Alexander et al. | |
| 7,181,484 | B2 | 2/2007 | Stribaek et al. | |
| 8,572,153 | B1 * | 10/2013 | New | G06F 7/523 708/622 |
| 8,719,828 | B2 | 5/2014 | Lewis et al. | |
| 9,575,890 | B2 | 2/2017 | Busaba et al. | |
| 9,727,370 | B2 | 8/2017 | Greiner et al. | |
| 10,387,122 | B1 | 8/2019 | Olsen | |
| 11,132,198 | B2 | 9/2021 | Thompto et al. | |
| 2002/0108026 | A1 | 8/2002 | Balmer et al. | |
| 2004/0044716 | A1 | 3/2004 | Colon-Bonet | |
| 2004/0078554 | A1 | 4/2004 | Glossner et al. | |
| 2005/0138323 | A1 | 6/2005 | Snyder | |
| 2005/0172106 | A1 | 8/2005 | Ford et al. | |
| 2005/0240644 | A1 | 10/2005 | Van Berkel et al. | |
| 2006/0095729 | A1 | 5/2006 | Hokenek et al. | |
| 2009/0248780 | A1 * | 10/2009 | Symes | G06F 9/3001 708/492 |
| 2013/0205123 | A1 | 8/2013 | Vorbach | |
| 2013/0212354 | A1 * | 8/2013 | Mimar | G06F 9/30038 712/E9.023 |
| 2019/0012170 | A1 | 1/2019 | Qadeer et al. | |
| 2019/0171448 | A1 | 6/2019 | Chen et al. | |
| 2019/0250915 | A1 | 8/2019 | Yadavalli | |
| 2019/0294412 | A1 * | 9/2019 | Loh | G06F 7/49947 |
| 2020/0320662 | A1 | 10/2020 | Lueh et al. | |
| 2021/0173662 | A1 | 6/2021 | Leenstra et al. | |

FOREIGN PATENT DOCUMENTS

| | | | |
|---|---|---|---|
| CN | 105378651 | A | 3/2016 |
| CN | 108874744 | A | 11/2018 |
| CN | 114787772 | A | 7/2022 |
| DE | 112020004071 | B4 | 4/2025 |
| EP | 0876026 | A2 | 11/1998 |
| GB | 2603653 | A | 8/2022 |
| JP | 2022-546034 | A | 11/2022 |
| WO | 2021/038337 | A1 | 3/2021 |

OTHER PUBLICATIONS

English-language translation of Notice of Reasons for Refusal dated Feb. 20, 2024 received in a corresponding foreign patent application, namely Japanese Patent Application No. 2022-513041, 9 pages.

Pedram et al., "On the Efficiency of Register File versus Broadcast Interconnect for Collective Communications in Data-Parallel Hardware Accelerators", IEEE 24th International Symposium on Computer Architecture and High Performance Computing (SBAC-PAD), Oct. 2012, pp. 1-8.

Kim et al., "An Instruction Set and Microarchitecture for Instruction Level Distributed Processing", ACM SIGARCH Computer Architecture News 30(2) • Apr. 2002, 11 pages.

Anonymous, "Method for removing accumulator dependencies", IP.com Prior Art Database Technical Disclosure, IP.com No. IPCOM000008848D, Jul. 17, 2001, 6 pages.

Anonymous, "Using a common Error Correcting Special Purpose Register for correcting errors in a regular file", IP.com Prior Art Database Technical Disclosure, IP.com No. IPCOM000202463D, Dec. 16, 2010, 3 pages.

Anonymous, "Methods for Application Checkpointing using Application Dependence Analysis", IP.com Prior Art Database Technical Disclosure, IP.com No. IPCOM000222538D, Oct. 16, 2012, 6 pages.

International Search Report and Written Opinion dated Nov. 3, 2020 received in a corresponding foreign application, 7 pages.

List of IBM Patents or Patent Applications Treated as Related dated Jul. 28, 2023, 2 pages.

G.R. Wilson, "Embedded Systems and Computer Architecture", Reed Elsevier pie group, pp. 216-224 (Year: 2002).

Anonymous, "Method to Prime and De-prime the Accumulator Register for Dense Math Engine (MMA) Execution", Jul. 27, 2020, IP.com, pp. 1-6.

* cited by examiner

COMPUTING SYSTEM HAVING AN ACCUMULATOR REGISTER HAVING ENTRIES HAVING A BIT WIDTH LARGER THAN A MAIN REGISTER FILE

BACKGROUND OF INVENTION

The present invention generally relates to data processing systems, processors, and more specifically to accumulator register files in processors, including accumulator registers associated with one or more dense math execution units such as, for example, one or more matrix-multiply-accumulator (MMA) units.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware units connected in series like a pipeline or pipeline-like structure within a processor to process multiple instructions in a single processing cycle. Pipelining involves processing instructions in stages, so that a number of instructions are processed concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

A design to increase computation throughput is to have specialized computation units, e.g., matrix-multiply-accumulator units (MMA units), to handle various data types and to perform highly-parallel tasks. Wide single instruction, multiple data (SIMD) dataflows are one way to achieve high computational throughput.

SUMMARY

The summary of the disclosure is given to aid understanding of a computer system, computer architectural structure, processor, register files including accumulator register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

A computer system for processing information is disclosed where the computer system includes: at least one processor; a main register file associated with the at least one processor, the main register file having a plurality of entries for storing data, one or more write ports to write data to the main register file entries, and one or more read ports to read data from the main register file entries; one or more execution units including a dense math execution unit; and at least one accumulator register file having a plurality of entries for storing data, the at least one accumulator register file associated with the dense math execution unit. In one or more embodiments, the processor is configured to process data in the dense math execution unit where the results of the dense math execution unit are written to the accumulator register file. In an aspect, the processor is configured to write results back to the same accumulator register file entry multiple times. The processor in an embodiment is further configured to write data from the accumulator register file to the main register file. Preferably, the processor is configured to write data from the accumulator register file to a plurality of main register file entries in response to an instruction accessing a main register file entry that is mapped to an accumulator register file.

The processor in an aspect is configured to prime the accumulator file register to receive data, and in a preferred aspect is configured to prime the accumulator file register in response to an instruction to store data to the accumulator register file. The processor in an embodiment, in response to priming an accumulator register file entry, marks the one or more main register file entries mapped to the primed accumulator register file as busy. The accumulator register file is preferably local to the dense math unit, and in an aspect the dense math execution unit is a matrix-multiply-accumulator (MMA) unit and the accumulator register file is located in the MMA. Each entry in the accumulator register file in an embodiment is mapped to a plurality of main register file entries.

In an embodiment, a processor for processing information, is disclosed where the processor includes: a main register file associated with the at least one processor, the main register file having a plurality of entries for storing data, one or more write ports to write data to the main register file entries, and one or more read ports to read data from the main register file entries; one or more execution units including a dense math execution unit; and at least one accumulator register file having a plurality of entries for storing data, the at least one accumulator register file associated with the dense math execution unit, and the bit field width of the accumulator register file being wider than the bit field width of the main register file. In an aspect, the processor is configured to process data in the dense math execution unit in a manner so the results of the dense math execution unit are written multiple times to the same accumulator file register entry, and configured to write data from the accumulator register file entry that was written multiple times back to the main register file entries.

In another aspect, a computer system for processing information is disclosed where the computer system includes: at least one processor; a main register file associated with the at least one processor, the main register file having a plurality of entries for storing data, one or more write ports to write data to the main register file entries, and a plurality of read ports to read data from the register file entries; one or more execution units, including a dense math execution unit; at least one accumulator register file having a plurality of entries for storing data, that at least one accumulator register file having a plurality of entries for storing data, the at least one accumulator register file associated with the dense math execution unit, one or more computer readable storage media; and programming instructions stored on the one or more computer readable storage media for execution by the at least one processor. The programming instructions in an embodiment, when executed on the processor cause the dense math unit to write results to the same accumulator register file entry multiple times. Preferably, the programming instructions, in response to the processor processing dense math execution unit instructions, cause the processor to: map a single accumulator register file entry to a plurality of main register file entries; write results to the same accumulator register file entry a plurality of times; de-prime the accumulator register file entry written to the plurality of times; write the resulting data from the accumulator register file entry written to the plurality of times to the main register file; and deallocate the accumulator register file entry that was de-primed.

A method of processing instructions in a processor is also disclosed. The method in one or more embodiments includes: providing an accumulator register file associated with a dense math execution unit; performing dense math operations with the dense math execution unit; and writing results of the dense math operations with the dense math execution unit to the accumulator register file. In an aspect the method further includes the dense math execution unit reading and writing the accumulator register file without writing a main file register. The accumulator register file in an embodiment is both a source and a target during dense math execution unit operations. The method preferably includes writing the same accumulator register file entry several times during dense math execution unit operations, and in an aspect the method includes writing the accumulator register file data to a main register file.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of the computer system, computer architectural structure, processors, register files including accumulator register files, and/or their method of operation will be better understood when read in conjunction with the figures provided. Embodiments are provided in the figures for the purpose of illustrating aspects, features, and/or various embodiments of the computer system, computer architectural structure, processors, register files, accumulator register files, and their method of operation, but the claims should not be limited to the precise system, embodiments, methods, processes and/or devices shown, and the features, and/or processes shown may be used singularly or in combination with other features, and/or processes.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, accumulator register files, and their method of operation, however, it will be understood by those skilled in the art that different and numerous embodiments of the computer system, computer architectural structure, processor, register files, accumulator register files, and their method of operation may be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms “a,” “an” and “the” include plural referents unless otherwise specified, and that the terms “comprises” and/or “comprising” specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and, in particular, with processors which operate in an out-of-order execution fashion, including multi-slice processors and their use of registers. It may be noted that a numbered element is numbered according to the figure in which the element is introduced, and is often, but not always, referred to by that number in succeeding figures.

Figure 1:
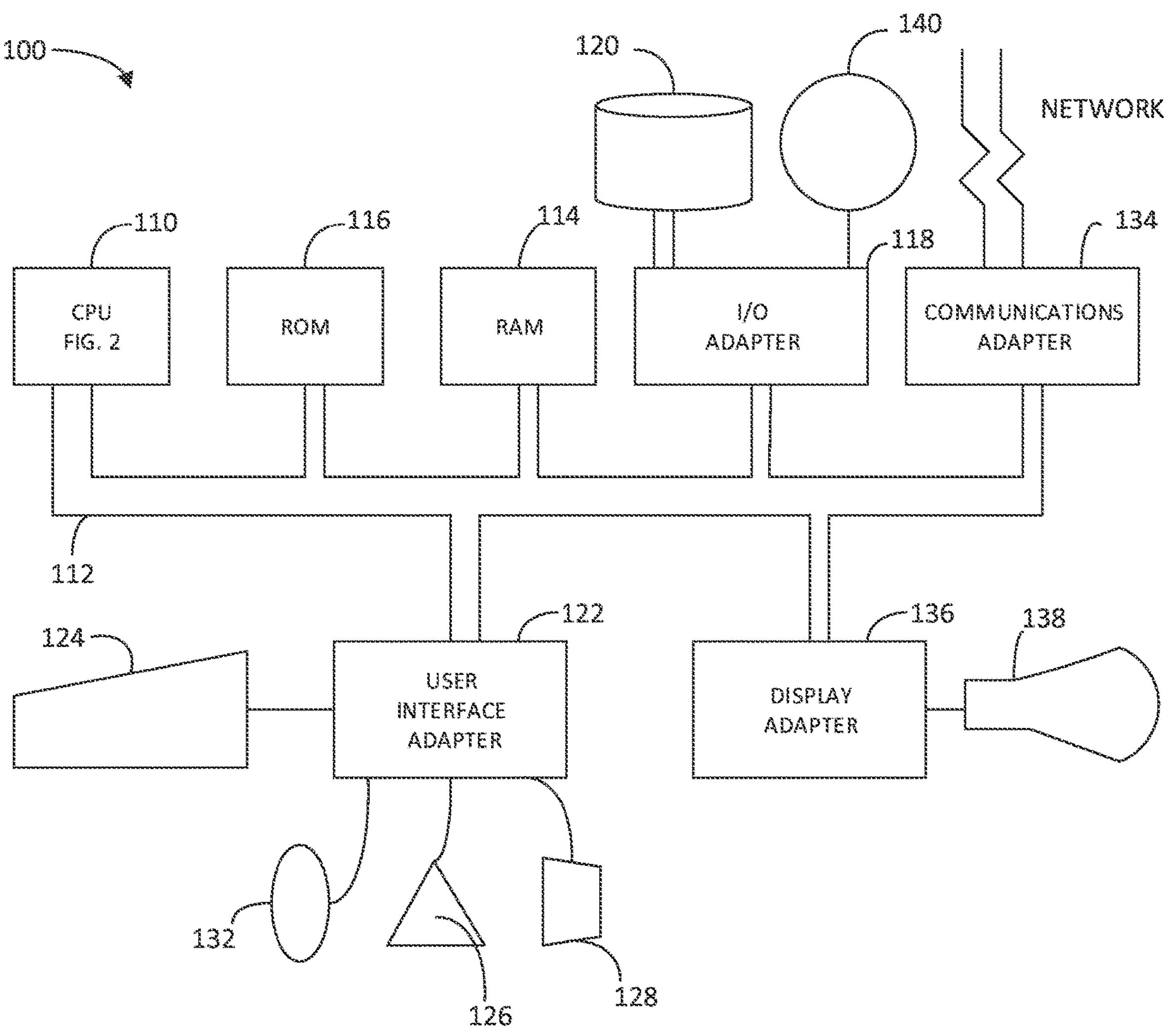
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory (“ROM”) 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
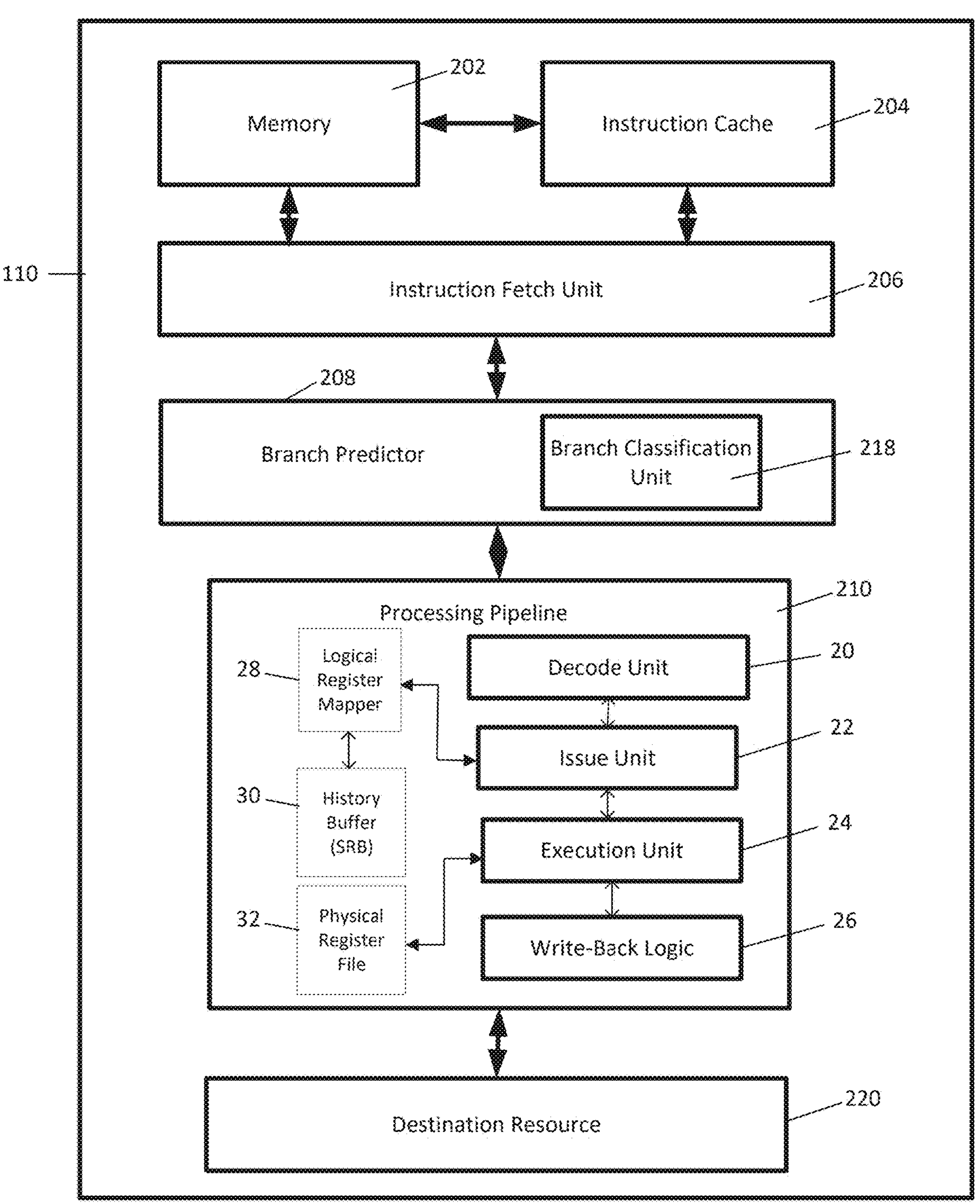
FIG. 2 illustrates a block diagram of a processor in which certain aspects of the present disclosure may be practiced.

FIG. 2 depicts a simplified block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units (LSUs), vector scalar execution units (VSUs), and/or other execution units. The logical register mapper 28 contains entries which provide a mapping between a logical register entry (LReg) and an entry in the physical register file 32. When an instruction specifies to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data in case the new instruction is flushed and the old data needs to be recovered. The history (SRB) 30 buffer keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
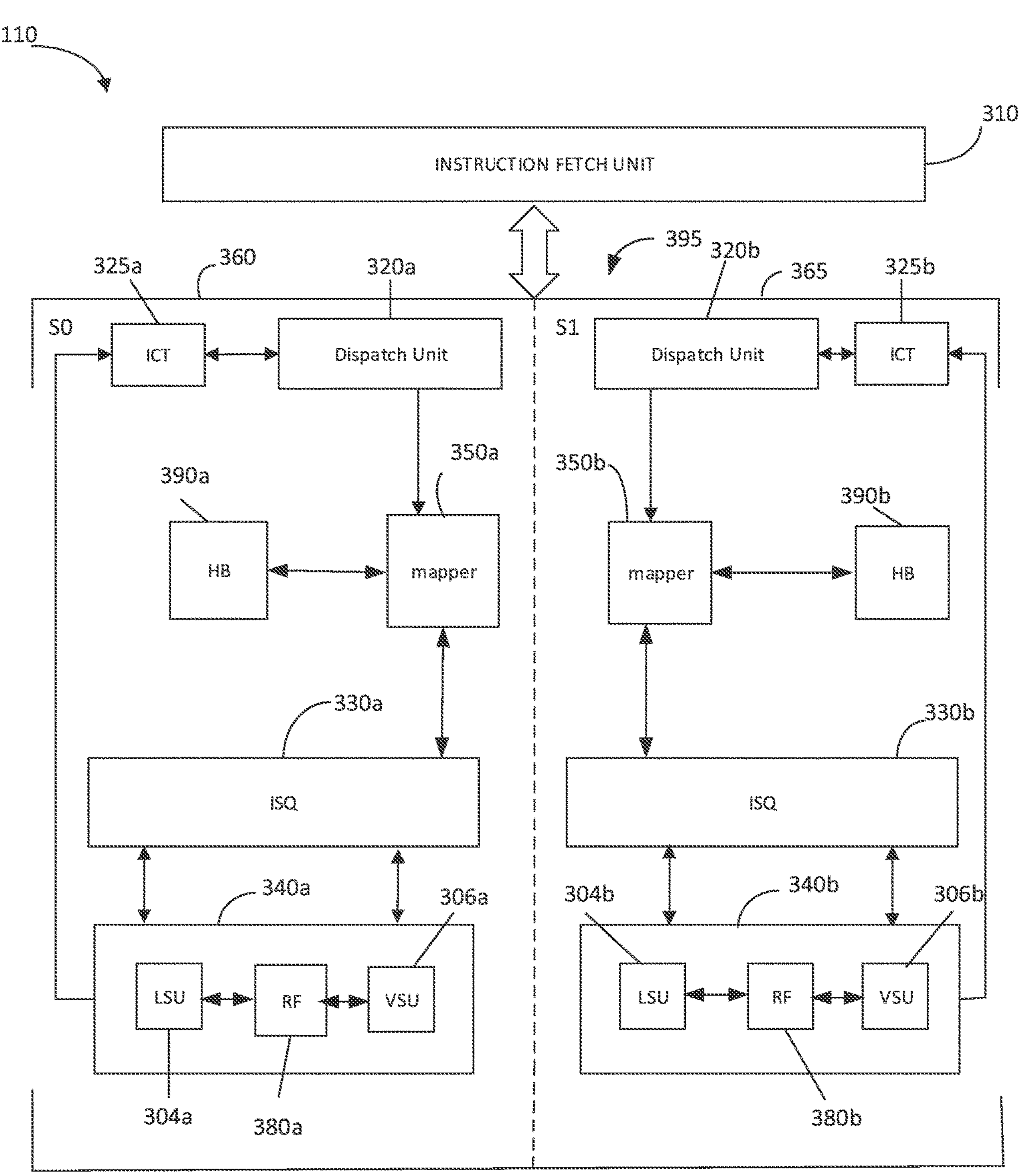
FIG. 3 illustrates a block diagram of a portion of a multi-slice processor in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices—Slice 0 (slice S0 or 360) and Slice 1 (slice S1 or 365). The processor includes an Instruction Fetch unit 310. Each of the slices S0 and S1 includes an Instruction Dispatch Unit (320*a* and 320*b*); a Logical Register Mapper (350*a* and 350*b*); a History Buffer (HB) (370*a* and 370*b*); an Issue Queue (ISQ) (330*a* and 330*b*); an Instruction Completion Table (ICT)

(325a and 325b); and Execution Units (340a and 340b) that include a load store unit (LSU) (304a and 304b), a vector scalar unit (VSU) (306a and 306b), and a Register File (RF) (380a and 380b). The Execution Unit 340 may include one or more queues to hold instructions for execution by the Execution Unit 340.

It may be noted that the two slices are shown for ease of illustration and discussion only, and that multi-slice processor 110 may include more than two processing or execution slices with each slice having all the components discussed above for each of the slices S0 and S1 (slices 360 and 365). Further, the processing slices may be grouped into super slices (SS 395), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

In certain aspects, the ISQ 330 holds a set of instructions and the register file 380 accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the execution units, e.g., LSUs 304 and VSUs 306, may make result data available on the write back buses for writing to a register file (RF) entry.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 in one or more embodiments will stamp each instruction dispatched to the Issue Queue 330 with an identifier, e.g., identification tag (iTag), to identify the instruction. The Dispatch Unit 320 may stamp instructions with other information and meta data. The instructions (iTags) typically are allocated (assigned) and stamped in ascending program order on a per thread basis by the Dispatch Unit 320.

Logical register mapper 350 contains meta data (e.g., iTag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry. The Execution Unit 340 executes instructions out-of-order and when the Execution Unit 340 finishes an instruction, the Execution Unit 340 will send the finished instruction, e.g., iTag, to the ICT 325. The ICT 325 contains a queue of the instructions dispatched by the Dispatch Unit 320 and tracks the progress of the instructions as they are processed.

History buffer (SRB) 390 contains logical register entries that are evicted from the logical register mapper 350 by younger instructions. The information stored in the history buffer (SRB) 390 may include the iTag of the instruction that evicted the logical register entry (i.e., the evictor iTag) from the logical register. History buffer (SRB) 390, in an embodiment, stores iTag, logical register entry number (the bit field that identifies the logical register entry (LReg)), and Register File tag (RFTag) information. History buffer (SRB) 390 may store and track other information. History buffer (SRB) 390 has an interface to the logical register mapper 350 to recover the iTag, and register file tag (RFTag) (and other meta data) for each evicted logical register entry (LReg). The information is kept in the history buffer (SRB) 390 in a history buffer (SRB) entry until the new instruction (evictor instruction) is completed. At which point, in an embodiment, the entry is removed from the history buffer (SRB) 390.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4) are simultaneously processed.

In an aspect, each execution/processing slice may have its own register file as shown in FIG. 3. In another aspect, one register file may be allocated per super slice and shared by the processing slices of the super slice. In one aspect, one register file may be allocated to more than one super slice and shared by the processing slices of the super slices. For example, slices S0, S1, S2, and S3 may be allocated to share one register file. The register files will be discussed in more detail below.

In a processor, it is not unusual to have register renaming of in-flight instructions to improve out-of-order execution of instructions. However, in situations where execution units with high compute and throughput are used, e.g., dense math operations, register renaming of in-flight instructions can result in a lot of data movement that can consume power to handle, and can also introduce unnecessary delay and latency because of one or more execution bubbles. In one or more embodiments, accumulator register files are used and a process using accumulator register file renaming with dense math instructions is performed. Accumulator register files and accumulator register file renaming processes are used so that data movement during execution is minimized to reduce power and improve execution throughput. To enter the accumulator register renaming mode, in an aspect, the accumulator registers are primed. After the accumulator registers are primed, the dense math execution unit, e.g., the matrix-multiply-accumulator (MMA) unit and/or inference engine, in one or more embodiments, can read and write the accumulator registers locally without needing to write the main register file. Preferably, the dense math execution unit accesses, reads, and or writes the same accumulator register file entry multiple times without renaming a new accumulator register file and/or writing back to the main file register.

When the dense math operations are completed, and/or in response to predetermined operations and instructions, in an embodiment, the result(s) in the accumulator register file can be written to the main register file and/or main memory.

Preferably, the accumulator register(s) is local to the MMA unit, and in one or more embodiments the accumulator register(s) may reside in the MMA unit. In a further embodiment, the accumulator register may have entries that have a bit field width that are wider than the bit field width of the main register file entries. In an aspect, the accumulator register files are de-primed when the dense math execution unit operation is complete. When the dense math execution unit operation is complete, in an aspect, the results stored in the accumulator register file can be moved from the accumulator register file to the main register file to permit subsequent instructions, e.g., subsequent non-dense math instructions, to use those results. The accumulator register file entries written back to the main register file in an embodiment can be deallocated. In one or more embodiments, a process, processor architecture, and system is described using one or more accumulator registers in association with, local to, and/or located within one or more dense math execution units, e.g., one or more inference engines and/or MMA units, to handle dense math instructions. An inference engine in an embodiment can be a set of eight (8) matrix-multiply-accumulate (MMA) units, and thirty-two (32) 512 bit accumulator registers.

Figure 4:
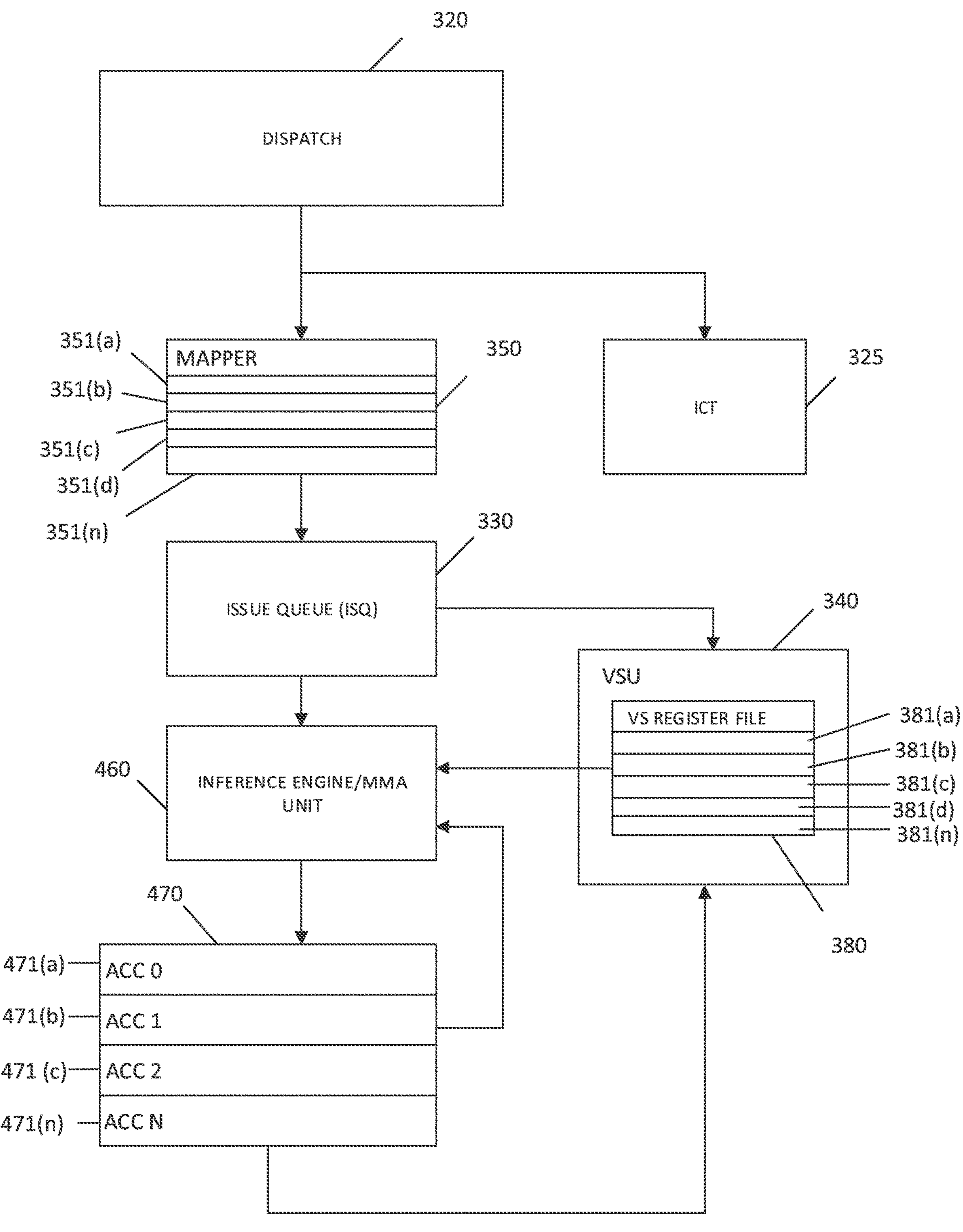
FIG. 4 illustrates a block diagram of a portion of a multi-slice processor having an accumulator register file in accordance with an embodiment of the disclosure.

FIG. 4 shows a simplified block diagram of a processing pipeline utilizing an accumulator register file in association with an execution unit, e.g., an inference engine/MMA unit, and a vector/scalar (VS) main register file located within a vector scalar (VS) execution unit (VSU). The processing pipeline or execution slice includes a dispatch unit 320, a logical mapper 350 having a plurality of entries 351(*a*)-351(*n*), an instruction complete table (ICT) 325, an issue queue (ISQ) 330, a matrix multiply accumulator (MMA) unit 460, an accumulator register file 470 having a plurality of entries 471(*a*)-471(*n*), and a VS execution unit (VSU) 340 having a main (VS) register file 380 having a plurality of entries 381(*a*)-381(*n*). While the accumulator register file 470 is illustrated in FIG. 4 as being associated with and local to the inference engine/MMA unit 460, in one or more embodiments the accumulator register file 470 can reside within the MMA unit 460. During inference engine and/or MMA operations, in one or more embodiments, the accumulator register file 470 is utilized as a source and a target (accumulator). That is, in an aspect, as the MMA operates it uses operands from the accumulator register file and writes results back to the accumulator register file, and in an embodiment writes the results back to the same accumulator register file entry 471(*n*). In one or more embodiments, the result of the inference engine/MMA unit can be written back to the same target accumulator register file entry 471(*n*) multiple times. In this manner, the processor, including the VS or main register file, during inference engine or MMA operations does not undergo renaming operations.

In one or more embodiments, the bit field width of the accumulator register file 470 is wider than the bit field width of the main (VS) register file 380. In an embodiment, the accumulator register file 470 is a pool of wide bit accumulator register file entries 471(*a*)-471(*n*). For example, in an embodiment, the accumulator register file 470 is a pool of 64 physical 512 bit register entries 471, while the VS main register file is 128 bits wide. Each accumulator register file entry 471 in an embodiment holds a plurality of main register file entries, and in an embodiment holds a set of four consecutive main VS register file entries (381(*n*)-381(*n*+3)).

Figure 5:
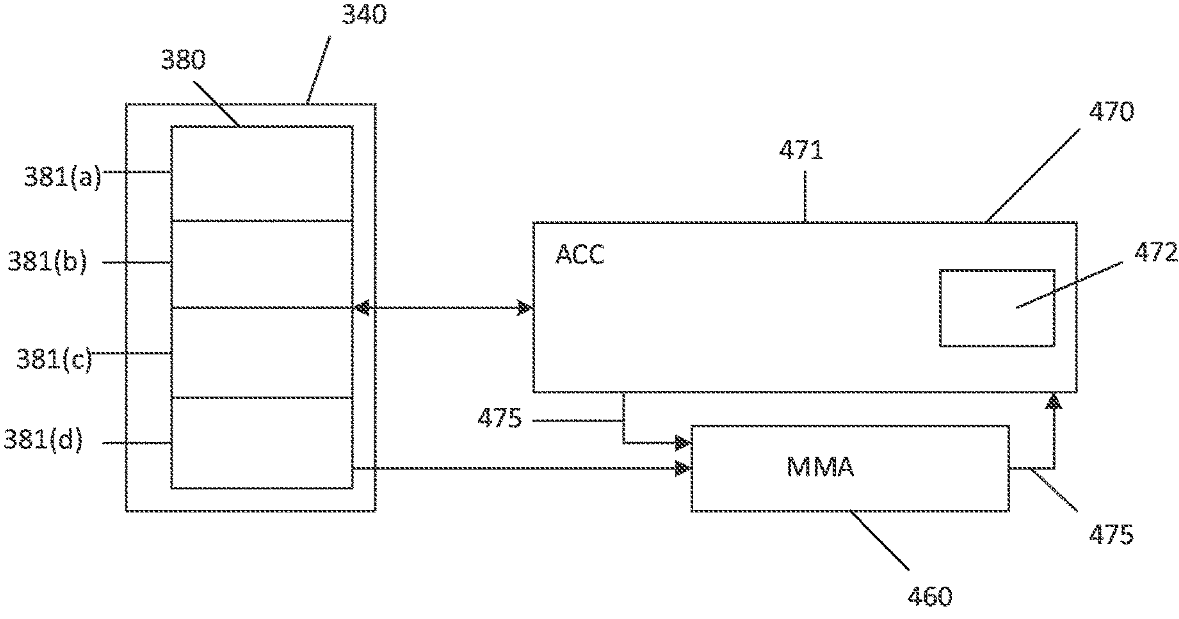
FIG. 5 illustrates simplified block diagram showing the set-up of a MMA unit, accumulator register file and a physical VS register file in accordance with an embodiment of the disclosure.

In a simplified block diagram of FIG. 5, a VS or main register file 380 having four entries 381(*a*)-381(*d*) are shown, which are mapped to a single accumulator register entry 471 in the accumulator register file 470. In an example, four consecutive 128 bit main VS register file entries 381(*a*)-381(*d*) are mapped to a single 512 bit accumulator register file entry 471. In one or more embodiments, there are eight (8) logical accumulator registers (ACC0-ACC7) per thread. These eight (8) logical accumulator registers are mapped to thirty-two (32) physical registers in the accumulator array, e.g., the accumulator register file.

Instructions are used to set-up and run the dense math execution unit, e.g., the inference engine and/or one or more MMA units. General Matrix Rank Operation ("ger") instructions are one example, and in one or more aspects perform $n^2$ operations on 2n data. The inference engine/MMA unit workload typically has three parts. The accumulator register file is primed with initial data to perform its operations. Multiply operations are performed in the MMA unit(s) and results are accumulated in the accumulator register file. And, in an aspect when the dense math execution unit is complete, and/or in response to certain instructions, the results in the accumulator register file are written back to memory, e.g., the main register file and/or main memory. Accumulator instructions ("ger" instructions) usually have two VSR operand sources, an accumulator VSR destination, and an accumulator VSR source.

To start dense math operations, e.g., MMA unit operations, in one or more embodiments, the processor will decode and/or detect a dense math instruction, e.g., an inference engine/MMA unit "ger" instruction. Each dense math instruction in an embodiment has an iTag and will utilize one full dispatch lane and one full issue queue (ISQ) entry. In an aspect, the main register mapper 350 assigns four targets (main register file entries) per dense math instruction, e.g., MMA unit instruction. The main register mapper 350 in an embodiment also evicts mapper entries from the main register mapper 350. For an instruction that writes the same accumulator register file entry, e.g., 471(*a*) in FIG. 4, the main register mapper 350 does not allocate new main register file tags RFTags (entries), but the register mapper 350 will need a new iTag for the new instruction. In one or more aspects, if a dense math instruction (iTag) that utilizes the accumulator register file 470 is complete, the main register file entries (RFTags) are not deallocated if the accumulator register file 470 has not written the results to the main register file 380. The main register file entry (RFTag) is deallocated when and/or in response to the data in the corresponding accumulator register file entry being pushed to write back the data to the main register file 380, e.g., in response to a younger non-dense math instruction.

In an embodiment, the main register mapper 350 will mark the main register file entries mapped to the accumulator register file entry. In an aspect, the main register mapper 350 will write the same accumulator register file iTag into a plurality of consecutive main register file entries 381, e.g., VSR(n)-VSR(n+3). That is, one iTag is aliased to a group of consecutive main register file entries, e.g., four main register file entries 381(*n*)-381(*n*+3). A younger non-dense math instruction that reads or writes the main register file entries assigned to the accumulator register file entries (to the locked out main register file entries), will notify the issue queue (ISQ) 330 to start the write back process. In one or more embodiments, a sequence of move-from-accumulator instructions are sent by the dispatch unit 320 and issued by the issue unit 330, to read the contents of the accumulator register from the accumulator register file 470. In one or more alternative embodiments, the write back process involves stopping dispatch unit 320, and notifying the issue queue 330 to drain the data in the accumulator register file 470 before the issue queue can resume issuing instructions. In an aspect, instructions that write the same group of main register file entries are marked to issue in-order.

In one or more embodiments, dense math instructions that utilize the accumulator register file 470 issue from the issue queue 330 in order preferably by register number, and in an aspect by instruction type. The issue rate of a dense math instruction utilizing the accumulator register file in an aspect is one instruction per cycle (except for the first instruction to issue to prime the accumulator register file which may take more than one cycle). The instructions utilizing the accumulator register file preferably issue in order and back-to-back. If there are older instructions that utilize the accumulator register file, the issue queue can issue the older instruction since the older instruction will read or write the main register file, but the accumulator register file will update only the accumulator register file until the data in the accumulator register file can be pushed to write back to the main register file.

The accumulator register file in one or more embodiments should be primed. In one or more embodiments, each accumulator register file is primed as needed. Where the accumulator register file is a data source, the accumulator register file, and in particular, the accumulator register file entries utilizing the data, should be primed to start dense math operations, e.g., MMA operations, that utilize the accumulator register file. The accumulator register file is primed when it is written to from memory, e.g., main register file and/or main memory, or as the result of a priming instruction. For example, an instruction, e.g., xxmtacc, can move data from the main (VS) register file to the accumulator register file in order to get the accumulator register file and the main (VS) register file in sync. In another example, an instruction, e.g., lxacc, can load and move data from main memory to the accumulator register file. In a further example, the accumulator register file is primed where the data in its entry/entries is set to zero. Other instructions to prime the accumulator register file are contemplated.

In an embodiment, the vector scalar (VS) execution unit (VSU) will write main (VS) register primary data and the iTag of the instruction that is doing the priming into the appropriate accumulator register file entry. Priming the accumulator register file also allocates the accumulator register rename. At priming, the accumulator register target is renamed and mapped to a physical register file entry. In reference to FIG. 5, during one example of priming, the accumulator register rename is allocated, and the VS register data in entries 381(*a*)-381(*d*) are written into the allocated accumulator register entry 471. In one or more embodiments, the VS execution unit will write the main (VS) register file data and iTag of the instruction that is doing the priming into the mapped accumulator register file. In one or more embodiments, an accumulator free list 472 maintains the count of allocated and free accumulator tags. The accumulator tags identify the accumulator register file entries. In an aspect, an accumulator register file busy flag is used to indicate that the accumulator register file entry is currently active. When all accumulator register file entries are occupied, dispatch will stall in similar fashion to a main register resource stall.

The first time an instruction issues that utilizes the accumulator register file in one or more embodiments will take two back-to-back cycles to prime the accumulator register file. If the accumulator busy flag is not set, in an embodiment it takes two cycles to issue the instruction because the accumulator register file will need to be primed/re-primed and the main register file needs to read the accumulator register file as sources. The second time an instruction issues that utilizes the accumulator register file preferably will take one cycle to issue. During priming and de-priming of the accumulator register, multiple main register file tags, e.g., four, will issue in one shot for each accumulator register file entry.

In dense math operations, the accumulator register file is not read and written to the main (VS) register file each cycle. Instead, large data results stay local to the dense math engine, e.g., MMA unit, through use of the accumulator register file. That is, MMA unit operations are written back to the accumulator register file. In an aspect, the same accumulator register file is written to multiple, e.g., a plurality of, times. Accumulator register file entries in an embodiment are not renamed with every instruction. The accumulator register file in one or more embodiments is utilized as a source and a target (accumulator) during MMA operations. The loop 475 in FIG. 5 illustrates the operations of the MMA unit rewriting the same target entry 471 in the accumulator register 470.

Each MMA unit instruction writes a single accumulator register file entry and sets the state of the target accumulator register entry to dirty, indicating that the accumulator register file entry and the corresponding main (VS) register file entries are not in sync. For MMA unit instructions, e.g., "ger" instructions, the accumulator register file stores the result, and the main (VS) register file does not store the result. While data will not be written back to the main register file in the main execution unit, e.g., the VSU, the main execution unit will update the accumulator register file iTag when it receives a new instruction from the issue queue. For an instruction that utilizes an accumulator register file entry, the iTag of the younger instruction utilizing the accumulator register file will replace the older iTag, but the main register file tag (RFTag) will not change.

The accumulator register file is de-primed and its data written back in response to a number of scenarios. In an embodiment, the accumulator register file is written back and/or de-primed in response to instructions, and/or where the main (VS) register file is sourced after the accumulator register is dirty. For example, in response to a move from accumulator register to main (VS) register file instruction, e.g., xxmfacc, the accumulator register file is de-primed and results in the accumulator register file are moved from the accumulator register file and written back to the main (VS) register file. In another example, a response to a move from the accumulator register file and store instruction, e.g., stxacc, the accumulator register file is de-primed and results in the accumulator register file are written back to main memory. In one or more embodiments, when an accumulator register file entry is dirty and is accessed by the main (VS) register file, the hardware will de-prime the accumulator register. In an embodiment, the hardware will run a sequence that writes all accumulator registers back to the main (VS) register file. In an aspect, each accumulator register file entry will be de-primed, the data in the accumulator register file will be written into the main VS register file, and the accumulator register file will also be deallocated from the rename pool. In one or more embodiments, where the accumulator register is primed and the main (VS) register file is targeted, the accumulator register will be de-primed even if the accumulator register was not dirty.

In response to a younger main execution unit instruction, e.g., a VSU instruction, touching a main register file that is mapped to an active accumulator register file, the issue queue in an embodiment is signaled to start the write back of the affected accumulator register file entry. In a preferred embodiment, this can occur by the execution of a series of internal operations inserted into the instruction stream. In an aspect, the issue queue will hold up the dispatch unit until the accumulator register is drained. That is, the accumulator register file writes data back to the corresponding main register file entries. In an aspect, it will take multiple cycles to write data back to the main register file, e.g., four cycles where the accumulator register file entry is mapped to four main register file entries. The main execution unit, e.g., the VSU, will finish the write back when the last part of the accumulator register file data is written back. The "ACC busy" flag will be reset (cleared) when the write back is complete. The dense math instruction that utilizes the accumulator register file is a single instruction and takes one Instruction Complete Table (ICT) 325 entry. The accumulator register instruction is complete when the last part of the data in the accumulator register file is written back to the main register file. The iTag of the competed instruction is broadcast to the history buffer (not shown in FIG. 4) to deallocate the main register file entries (RFTags). The processor will then process the younger non-dense math instructions including reading data from the main register file. In addition, after the accumulator register file is drained, and the ACC busy flag is cleared, the issue queue can resume issuing instructions, and the dispatch unit can resume dispatching instructions.

In an aspect, when a dense math instruction, e.g., a "ger" instruction, sources an accumulator register file that was not primed since the last de-prime (e.g., by xxmtacc or ldacc), the hardware will prime that accumulator register file entry. The hardware will run a sequence that primes the accumulator register file and allocates an accumulator register file entry (rename). The dense math instruction will then be executed.

Figure 6:
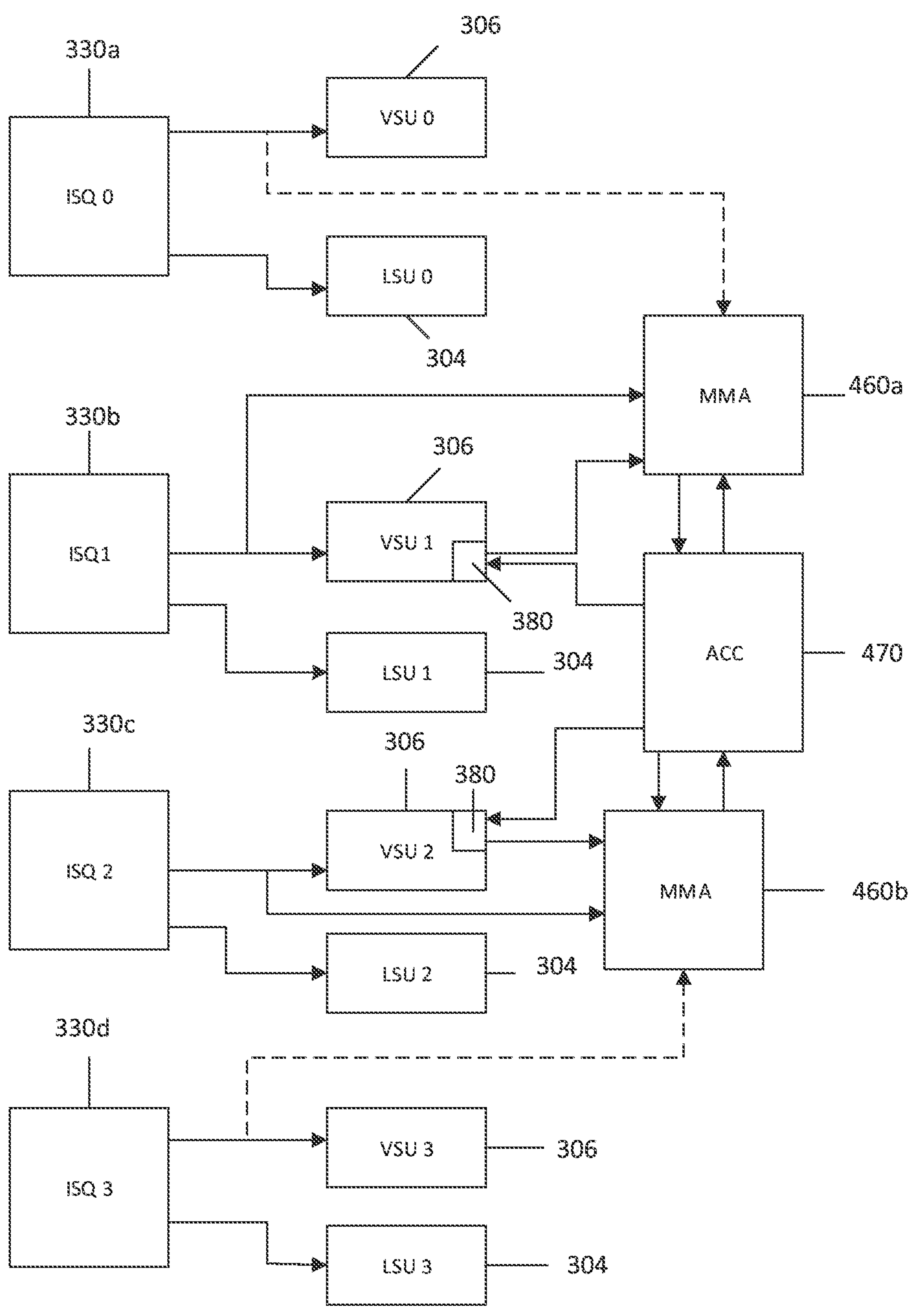
FIG. 6 illustrates simplified block diagram of two super slices of a processor having MMA units and accumulator register files.

FIG. 6 shows another embodiment of a processor having one or more dense math execution units, e.g., matrix-multiply-accumulator (MMA) units, in association with a local accumulator register file where the processor is configured so that the operations of the one or more dense math units write results back multiple times to the same accumulator register file entry. FIG. 6 shows two super slices of a processor for handling data. Each super slice includes at least one MMA unit 460, two vector scalar (VS) execution units 306 and two load store (LS) units 304. A single accumulator register file 470 is used in connection with both the MMA units 460. In an alternative embodiment, each execution slice could have its own MMA unit with a local accumulator register file, and in a further aspect, each MMA unit has the accumulator register file contained within the MMA unit in each execution slice. In the embodiment of FIG. 6, issue queue (ISQ) 1 330*b* in super slice 0 and issue queue (ISQ) 2 330*c* in super slice 1 issue instructions, e.g., "ger" instructions, to the respective MMA units (460*a* and 460*b*). Alternatively, as shown by dotted lines in FIG. 6, issue queue (ISQ) 0 330*a* and issue queue (ISQ) 3 330*d* could issue instructions, e.g., "ger" instructions, to each MMA unit (460*a* and 460*b*) in the respective super slice.

Figure 7:
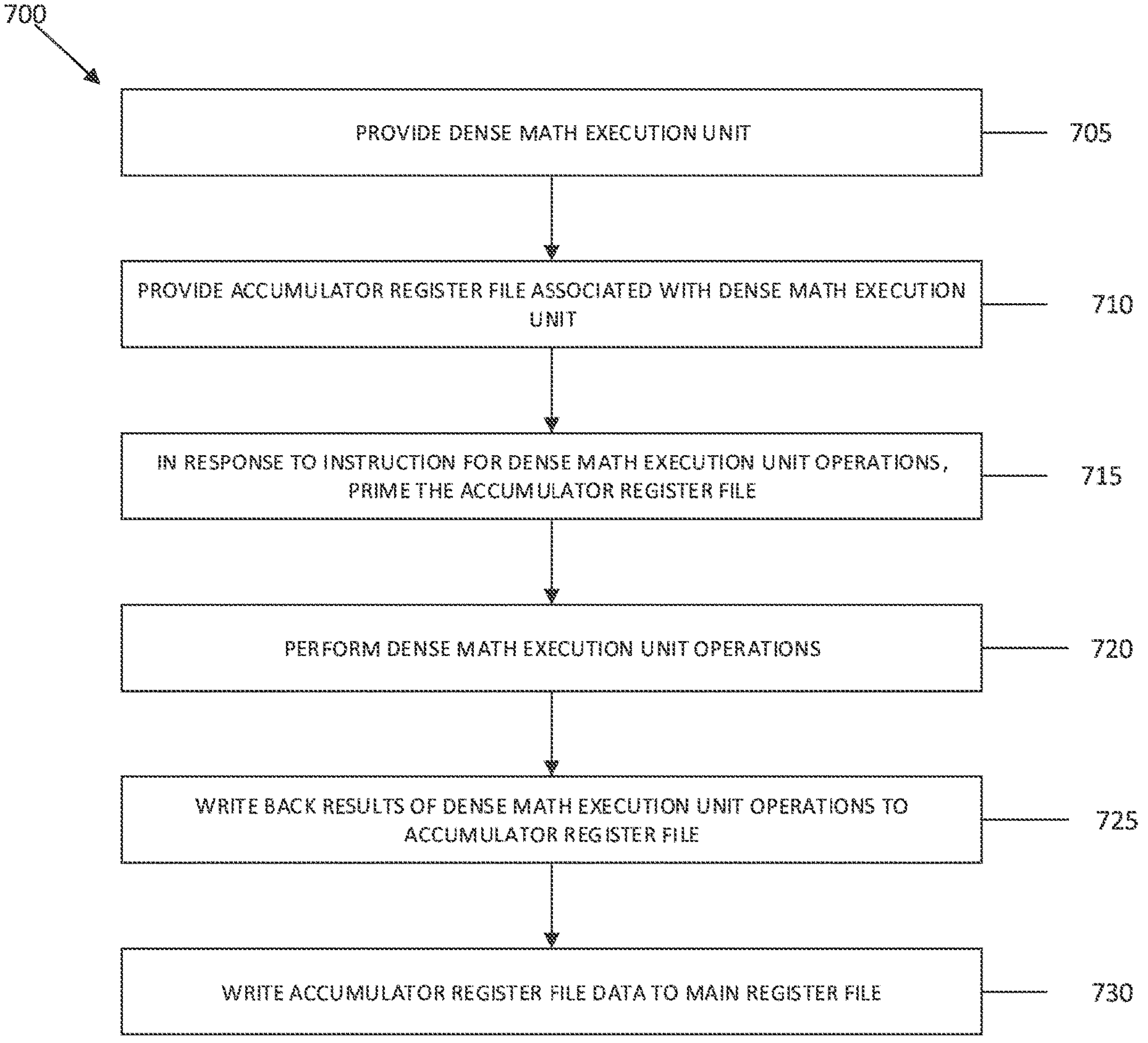
FIG. 7 illustrates a flow diagram of a method according to an embodiment for processing data in a processor.

FIG. 7 is an exemplary flowchart in accordance with one embodiment illustrating and describing a method of handling data, e.g., executing instructions, in a processor, including in an embodiment, processing and handling dense math instructions, e.g, MMA ("ger") instructions, in a processor in accordance with an embodiment of the present disclosure. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

The method 700 in FIG. 7 relates to processing data in a processor, more specifically to handling dense math operations by use of a dense math execution unit, for example, a MMA execution unit. At 705, a dense math execution unit is provided. In an example, a dense math execution unit is a matrix-multiply-accumulation (MMA) unit. In one or more examples, a dense math execution unit may be multiple MMA units arranged as an inference engine. Other dense math execution units are contemplated. In one or more embodiments, at 710, an accumulator register file is provided in association with the dense math execution unit. In an embodiment, the accumulator register file is local to one or more of the dense math execution units, and in an aspect the accumulator register file resides in a MMA unit. Preferably, the accumulator register file has a bit field width that is wider than the bit field width of the main register file in the processor. The accumulator register file in an embodiment is 512 bits wide while the main register file in the processor is 128 bits wide. According to an aspect, more than one main register file entry is mapped to an accumulator register file. For example, four consecutive main register files are mapped to one accumulator register file.

In one or more embodiments, in response to an instruction for dense math execution unit operations, at 715 the accumulator register is primed. For example, where the accumulator register file is a source for the dense math execution unit operations, the accumulator register file is primed. Priming the accumulator register file, in an embodiment, includes synchronizing the data in the accumulator register file with data that resides in the main register file, e.g., the VS register file, or data that resides in main memory. Priming the accumulator register file can also include clearing the data in the accumulator register file, e.g., setting the data in the accumulator register file entry to zero. In one or more embodiments, a dense math instruction, e.g., a "ger" instruction, can have no accumulator register file source data and that dense math instruction will be considered self-priming. The accumulator register file is primed when it is first written from the main register file, from main memory, or as a result of a self-priming instruction (where the data in the accumulator register file entry is set to zero). In one or more embodiments, the accumulator register file allocates an accumulator register file rename, the accumulator file is primed, and the value of the data in the accumulator register file is set to the value in a main register file, in main memory, or set to zero.

The dense math execution unit, e.g., the MMA and/or inference engine, in one or more embodiments at 720 undergoes dense math operations. That is, dense math operations are performed using the one or more dense math execution units, e.g., the inference engine and/or MMA unit(s). The results of the dense math execution unit, e.g., the inference engine and/or MMA unit(s) results, in an embodiment, at 725 are written back to the accumulator register file. That is, the accumulator register file is used as both a source and a target during dense math execution unit operations. The results of the dense math execution unit preferably are written back to the same target accumulator register file multiple times without renaming. That is, in an embodiment, a single accumulator register file target rename can be re-written multiple times. In one or more aspects, in response to a dense math execution unit instruction, e.g., a "ger" instruction, there is no write back to the main register file, and instead the accumulator register that is local to the dense math execution unit, e.g., the MMA unit, stores the result while the main register file does not store the result. In this manner, the dense math execution unit, e.g., the inference engine and/or MMA unit, operates without renaming main register file entries. In an embodiment, in response to the dense math execution unit writing results back to the accumulator register, the accumulator register file entry is flagged or marked, e.g., marked dirty.

At 730, the accumulator register file results in one or more embodiments are written back to the main register file and/or main memory. In an embodiment, when the dense math execution unit operations are complete, the results of the accumulator register file are written back to the main register file, and/or to main memory. In an embodiment, the accumulator register is deprimed, the value in the accumulator register file is written into the main register file (or main memory), and the accumulator register file entry is deallocated. In accordance with an embodiment, the main register file is written back in response to instructions, e.g., move from accumulator register file entry to main register file instructions (xxmfacc), and move from accumulator register file entry and store instructions (stxacc). The results of the accumulator register are also written back to the main register file when the main register file entry mapped to the accumulator register file entry is sourced or targeted and the accumulator register file entry is dirty. In an aspect, a defined read accumulator instruction will move data from the accumulator register file to the main register file. In an embodiment, after the accumulator is read, a series of store operations, e.g., "octo/quad word" store operations, will read the main register file and write to main memory.

In an embodiment, when the accumulator register file entry is dirty and is accessed by the main register, the hardware will de-prime the accumulator register file. In an aspect, when the main register file entry is targeted when the mapped accumulator register entry is primed, the hardware will de-prime the accumulator register even if the accumulator register was not dirty. The hardware will run a sequence that writes all the accumulator register file entries back to the main register file, the operation targeting the main register file entry will be executed, and each accumulator register file entry is deallocated from the rename pool.

In an aspect, when a dense math instruction, e.g., a "ger" instruction, sources an accumulator register file that was not primed since the last de-prime (e.g., by xxmtacc or ldacc), the hardware will prime that accumulator register file entry. In an aspect, the hardware will run a sequence that primes the accumulator register file and allocates an accumulator register file entry (rename). The dense math instruction will then be executed.

While the illustrative embodiments described above are preferably implemented in hardware, such as in units and circuitry of a processor, various aspects of the illustrative embodiments may be implemented in software as well. For example, it will be understood that each block of the flowchart illustrated in FIG. 7, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A processor for processing electronic data, the processor comprising:

a main physical register file having a plurality of main physical register file entries for storing main register data, each main physical register file entry having a main register file bit width for storing the main register data;

a physical accumulator register file separate and distinct from the main physical register file and having a plurality of physical accumulator register file entries for storing accumulator register data, each physical accumulator register file entry having an accumulator register bit field width, wherein the accumulator register bit field width is wider than the main register file bit field width;

one or more execution units for performing operations on the electronic data, wherein the processor is configured to:

map at least one of the plurality of main physical register file entries to at least one of the plurality of physical accumulator register file entries;

perform operations with the one or more execution units;

write results of the operations performed with the one or more execution units to the physical accumulator register file; and write data in the at least one of the plurality of physical accumulator register file entries to the at least one of the main physical register file entries to which the at least one of the plurality of physical accumulator register entries is mapped.

2. The processor of claim 1, wherein the processor is configured to read and write the at least one of the plurality of physical accumulator register file entries that is mapped to the at least one of the plurality of main physical register file entries without writing the main physical register file.

3. The processor of claim 1, wherein the processor is further configured so that the physical accumulator register file is both a source and a target during the operations of the one or more execution unit operations.

4. The processor of claim 1, wherein the processor is further configured to write the at least one of the plurality of physical accumulator register file entries that is mapped to the at least one of the plurality of main physical register file entries several times during operations of the one or more execution units without writing results of the operations of the one or more execution units to the main physical register file.

5. The processor of claim 1, wherein the one or more execution units include a dense math execution unit and the at least one physical accumulator register file is local to the dense math execution unit.

6. The processor of claim 5, wherein the dense math execution unit is a matrix-multiply-accumulator (MMA) unit and the at least one physical accumulator register file is located in the MMA.

7. A processor for processing instructions, the processor comprising:

a main physical register file having a plurality of main physical register file entries for storing main register data, each main physical register file entry having a main register bit field width for storing the main register data;

one or more execution units including a dense math execution unit;

at least one physical accumulator register file separate and distinct from the main physical register file and having a plurality of physical entries for storing accumulator register data, each physical accumulator register file entry of the at least one physical accumulator register file having an accumulator register bit field width that is wider than the main register bit field width of the plurality of main physical register file entries and wherein each physical entry in the at least one physical accumulator register file is mapped to a plurality of main physical register file entries, the processor configured to:

write results of the dense math execution unit to the at least one physical accumulator register file; and write data from the at least one physical accumulator register file to the main physical register file.

8. The processor of claim 7, wherein the processor is further configured to write results back to a same physical accumulator register file entry multiple times.

9. The processor of claim 7, wherein the processor is further configured to write data from the at least one physical accumulator register file to a plurality of main physical register file entries in response to an instruction accessing a main physical register file entry that is mapped to a physical accumulator register file entry.

10. The processor of claim 7, wherein the processor is further configured to prime the at least one physical accumulator register file to receive data.

11. The processor of claim 10, wherein the processor is further configured to mark, in response to priming a physical accumulator register file entry, the plurality of main physical register file entries mapped to the primed physical accumulator register file entry as busy.

12. The processor of claim 10, wherein the processor is further configured to prime the at least one physical accumulator register file in response to an instruction to store data to the at least one physical accumulator register file.

13. The processor of claim 7, wherein the at least one physical accumulator register file is local to the dense math execution unit.

14. The processor of claim 13, wherein the dense math execution unit is a matrix-multiply-accumulator (MMA) unit and the at least one physical accumulator register file is located in the MMA.

15. The processor of claim 7, wherein the processor further comprises a vector scalar execution unit (VSU) and the dense math execution unit is a matrix-multiply-accumulator (MMA) unit and the main physical register file is a VS register file located in the VSU and the at least one physical accumulator register file is mapped to a plurality of consecutive VS register file entries.

16. A computing system for processing information, the computing system comprising:

a main register file having a plurality of entries for storing main register data;

one or more execution units including a dense math execution unit;

at least one accumulator register file having a plurality of accumulator register file entries for storing accumulator register data, wherein the at least one accumulator register file is associated with the dense math execution unit, the computing system configured to:

prime at least one accumulator register file entry to receive data, wherein the at least one accumulator register file entry is at least one of the plurality of accumulator register file entries of the at least one accumulator register file associated with the dense math execution unit;

mark, in response to priming the at least one accumulator register file entry to receive data, one or more main register file entries mapped to the at least one primed accumulator register file entry as busy; and process data in the dense math execution unit where results of the dense math execution unit are written to the at least one primed accumulator register file entry.

17. The computing system of claim 16, the computing system further configured to:

prime the at least one accumulator register file entry to receive data in response to an instruction to store data to the at least one accumulator register file; and write results back to the at least one primed accumulator register file entry multiple times.

18. The computing system of claim 17, the computing system further configured to:

de-prime the at least one primed accumulator register file entry written to multiple times;

write the resulting data from the at least one primed accumulator register file entry written to multiple times to the main register file; and deallocate the at least one de-primed accumulator register file entry.

* * * * *